United States Patent
Nainani et al.

(10) Patent No.: US 6,185,577 B1
(45) Date of Patent: Feb. 6, 2001

(54) METHOD AND APPARATUS FOR INCREMENTAL UNDO

(75) Inventors: Bhagat Nainani, Foster City; Gary C. Ngai, Saratoga; Wei Huang, Foster City; Jonathan D. Klein, Redwood City; Roger J. Bamford, San Francisco, all of CA (US)

(73) Assignee: Oracle Corporation, Redwood Shores, CA (US)

( * ) Notice: Under 35 U.S.C. 154(b), the term of this patent shall be extended for 0 days.

(21) Appl. No.: 09/103,515

(22) Filed: Jun. 23, 1998

(51) Int. Cl.$^7$ .............................. G06F 12/00; G06F 17/30
(52) U.S. Cl. ................... 707/202; 707/204; 707/201; 714/15
(58) Field of Search ................... 707/204, 202, 707/203, 205, 201; 714/2, 15, 16

(56) References Cited

U.S. PATENT DOCUMENTS

| | | | |
|---|---|---|---|
| 4,498,145 | * | 2/1985 | Baker et al. ........................ 707/202 |
| 5,363,473 | * | 11/1994 | Stolfo et al. ........................ 395/50 |
| 5,481,699 | * | 1/1996 | Saether ................................ 714/15 |
| 5,524,205 | * | 6/1996 | Lomet et al. .................... 395/182.14 |
| 5,835,698 | * | 11/1998 | Harris et al. ........................ 714/15 |
| 5,850,507 | * | 12/1998 | Ngai et al. ..................... 395/182.14 |
| 5,864,849 | * | 1/1999 | Bohannon et al. ..................... 707/8 |
| 5,870,758 | * | 2/1999 | Bamford et al. ..................... 707/201 |
| 5,940,839 | * | 8/1999 | Chen et al. .......................... 707/202 |
| 5,999,943 | * | 12/1999 | Nori et al. ........................... 707/104 |

OTHER PUBLICATIONS

Strom et al "Optimistic Recovery in Distributed systems", ACM Transactions on Computer Systems, vol. 3, No. 3, Aug. 1985, pp. 204–226.*

Weikum et al "Multi–Level Recovery", ACM 1990, pp. 109–123.*

Gomes et al "Multiplexed State Saving for Bounded Rollback", Proceedings of the 1997 Winter simulation conference, Atlanta, GA, pp. 460–467.*

Microsoft Word User's Guide. Microsoft Corporation. 1993, pp. 14, 15, 40.*

* cited by examiner

Primary Examiner—Thomas G. Black
Assistant Examiner—Uyen Le
(74) Attorney, Agent, or Firm—Lyon & Lyon LLP

(57) ABSTRACT

A method and apparatus for incremental undo is provided. A process, executing in a database system, establishes a rollback entry in an undo log file as a current rollback entry. The rollback entry, which was selected from a set of rollback entries contained in an undo record, contains data that indicates a change made by a transaction to a data block in the database system. The process first determines whether the rollback entry has been applied by testing a status flag. In one embodiment, the status flag is a bit in a bit vector in the undo block. If the rollback entry has been applied to the database, then the rollback entry is not re-applied; rather, a next rollback entry is established from the set of rollback entries and the process repeats. If the rollback entry has not been applied, then undo information from the rollback entry is retrieved from the undo block and change is generated. The status flag is set to indicate that the rollback entry has been applied and a next rollback entry corresponding to the data block is retrieved. The process repeats until there are no more rollback entries to be performed, then the multiple changes are applied to disk in a single atomic operation.

18 Claims, 6 Drawing Sheets

METHOD AND APPARATUS FOR INCREMENTAL UNDO

FIELD OF THE INVENTION

The present invention relates to log files in a database management system, and more specifically to a method and apparatus for incrementally applying an undo record during transaction recovery or rollback.

BACKGROUND OF THE INVENTION

In a database management system (DBMS) executing a transaction that updates, deletes or modifies a body of data, the possibility exists for the transaction to fail (e.g., a communication failure) or for the computer system to fail (e.g., a device failure or a power failure). In either event, it is likely that changes made by one or more committed transactions will not yet have been written to disk, and/or that changes made by one or more uncommitted transactions will have been written to disk.

Transaction failures and computer failures are highly undesirable in a DBMS. One reason why failures in a DBMS can be particularly undesirable is because a DBMS can have hundreds or even thousands of users concurrently accessing and updating data. Changes written to disk by uncommitted transactions that fail can corrupt the database by placing the database in an inconsistent state. Similarly, the database can be corrupted by a failure if changes made by a committed transaction are lost before they are written to disk.

Maintaining log files is one method for protecting data from becoming corrupted by the occurrence of failures. A redo log is a record of changes made by transactions. An undo log is a record of how to undo changes made by transactions. Together, the redo log and the undo log assist in recovery of a DBMS after a failure.

FIG. 1 depicts a recovery process 100 that involves two general phases: a "redo" phase and an "undo" phase. Database 102 needs to be recovered (e.g., a power failure occurred). Prior to the failure, two transactions 132 and 136 performed changes to data contained in database 102. One of those transactions, transaction 132, committed prior to the failure. Transaction 132 is said to have committed because the change(s) completed and were persistently saved to disk in redo log 112, even though the changes themselves were not applied to the database 102. Transaction 136 was also written to redo log 112, which was persistently saved to disk; it too did not get applied to disk. However, transaction 136 did not commit.

Referring to the state of the DBMS depicted in FIG. 1, immediately after the power failure, changes made by committed transaction 132 are not reflected in database 102. However, changes made by a committed transaction must be durable, which means that they must persist on disk even if a failure occurred.

Redo log 112 fixes part of the problem. The redo log 112 contains a series of redo records that save changes made by statements in each transaction. (The redo log 112 may contain data for multiple transactions.) Redo log 112 is temporarily stored in memory and is saved to disk at a regular interval, called a savepoint, or by explicit or implicit instruction from a user or process (e.g., a redo log runs out of space in memory and must flush the redo to disk).

Redo log 112 contains redo records for changes made by committed transaction 132 and uncommitted transaction 136. When the database 102 is recovered, the first step in the recovery process is to apply the redo log 112, specifically, to apply the changes recorded in redo log 112 to database 102. After the redo log 112 has been applied, the database 102 will look like database 104, which reflects the changes made by transactions 132 and 136.

As may be apparent, applying redo log 112 created a problem, specifically, changes made by uncommitted transaction 136 are reflected in database 104. However, changes made by an uncommitted transaction must be removed from the database after a failure occurs. Uncommitted transactions should not be durable. Thus, the data modified by the changes made by transaction 136 is in an inconsistent state. The undo log 120 is designed to fix this problem.

Undo log 120 comprises one or more rollback segments. For example, segment 122 contains data for undoing the changes made by uncommitted transaction 136. After the redo phase, an "undo phase" is performed. During the undo phase, the undo log 120 is used to remove from the database 104 changes that were made to the database 104 by uncommitted transactions. Database 106 is a version of database 104 after applying undo log 120. Notice that changes made by uncommitted transaction 136 are not contained in database 106.

Thus, the changes made by uncommitted transaction 136, which were made when redo log 112 was applied in the redo phase can be "rolled back" using undo log 120 in the undo phase. As uncommitted transaction 136 is rolled back, each change made by transaction 136 is undone, one complete undo record at a time, in an opposite order than the order in which the changes were made.

The undo process described above, whereas simple and predictable, has significant drawbacks. For example, each undo record in the undo log 120 comprises an undo header and a single rollback entry (or "change"). Consequently, when rollback entries in the same undo block store similar information in their headers (e.g., same table space, block identifier, etc.) valuable space is wasted in the undo block. Further, valuable processing resources may also be wasted when generating a header for every rollback entry, as well as when reading the header for every rollback entry.

Further still, the undo records are applied to disk one complete undo record at a time, and then removed from the undo block to prevent the change from being applied more than once. This process further taxes valuable processing cycles.

There is a need for an improved method for applying an undo log.

SUMMARY OF THE INVENTION

A method and system for incremental undo is provided. According to one aspect of the techniques described herein, an undo record can correspond to more than one data block. In one embodiment, a process, executing in a database management system, establishes a rollback entry as a current rollback entry. The rollback entry, which was selected from a set of rollback entries in an undo record, corresponds to a change made by a transaction to a data block in the system. The process determines whether the rollback entry has been applied. In one embodiment, this is accomplished by testing a status flag in the undo record.

According to one embodiment, if the rollback entry has been applied to the data block, then the rollback entry is not re-applied. Subsequently, a next rollback entry is established in the undo record and the process repeats. If the rollback entry has not been applied, then undo information from the rollback entry is retrieved from the undo record so the change recorded in the rollback entry may be applied to the data block. A change is generated for the data block based upon the rollback entry and the status flag is set to indicate that the entry has been applied. Subsequently, a next rollback entry corresponding to the data block is retrieved. The process repeats until there are no more rollback entries corresponding to the data block. According to one embodiment, the application of a plurality of rollback entries is performed as a single atomic operation.

An advantage of the techniques described herein is that more than one change can be stored in an undo record. Further, less overhead is used when recording changes in the undo record. Additionally, the undo information takes up less space both in memory and on persistent storage. Further, more than one change may be applied to disk in a single atomic operation. The overall result is a more efficient recovery process.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for incremental undo is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 3:
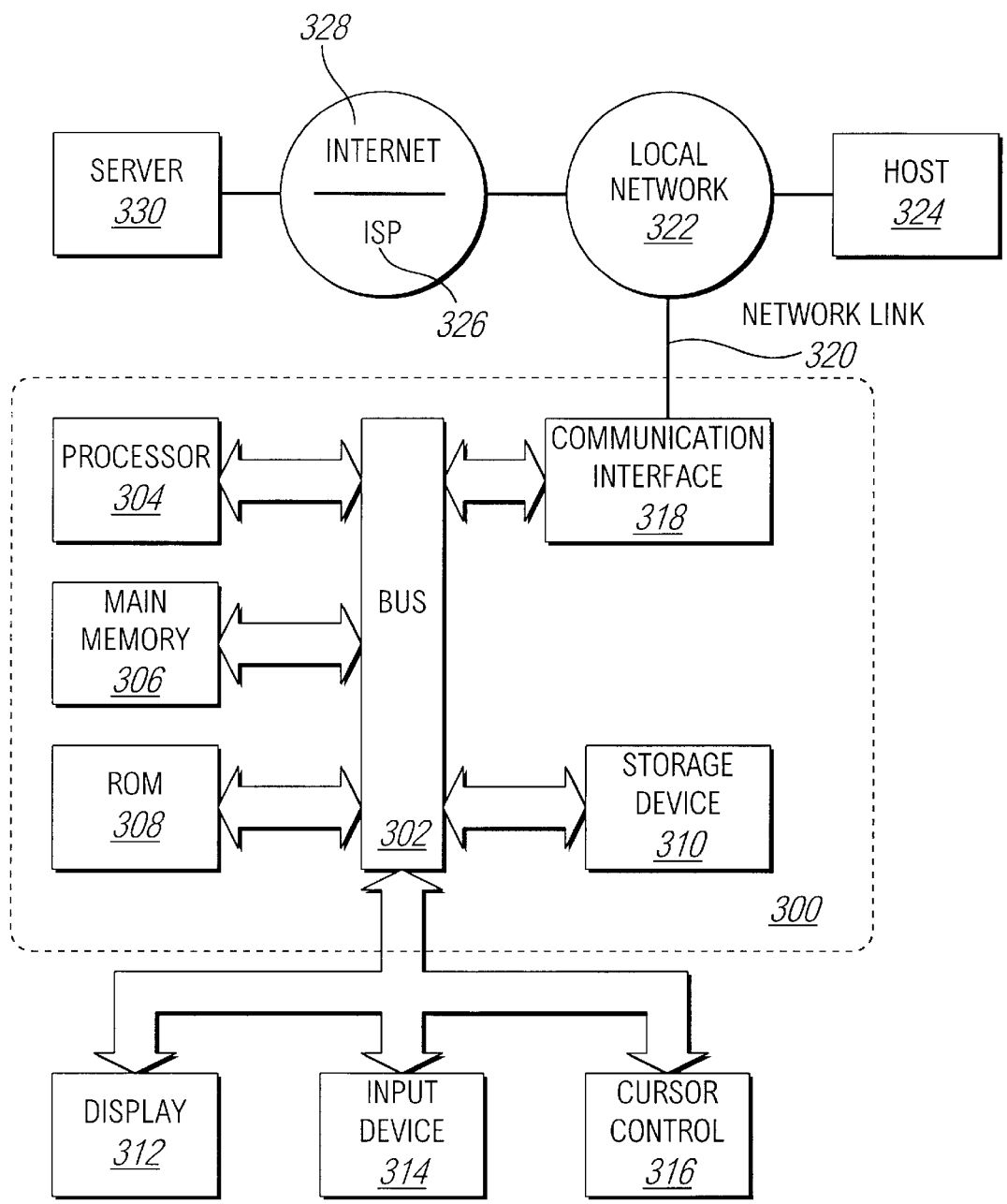
FIG. 3 is a computer system for implementing one embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for incrementally applying undo information. According to one embodiment of the invention, incremental undo is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector coupled to bus 302 can receive the data carried in the infra-red signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for incremental application of an undo log as described herein.

The received code may be executed by processor 304 as it is received, and/or stored in storage device 310, or other non-volatile storage for later execution. In this manner, computer system 300 may obtain application code in the form of a carrier wave.

Functional Overview

A method and system are provided for incrementally applying undo information. According to one aspect of the invention, a single undo record stores rollback entries for changes to more than one data block. In addition, individual rollback entries within a given undo record need not be applied as a single atomic operation. Rather, a selected set of one or more rollback entries within the undo record may be applied completely independent of the other rollback entries within the same undo record. Flags within the undo record are provided for keeping track of which rollback entries have and have not been applied.

According to one embodiment, a process, executing in a database system, establishes a rollback entry in an undo record as a current rollback entry. The rollback entry, which was selected from a set of rollback entries contained in the undo record, corresponds to a change made by a transaction to a data block in the database system. The process first determines whether the rollback entry has been applied. In one embodiment, this is accomplished by testing a bit vector in the undo record. For example, if a bit corresponding to a particular rollback entry is set to TRUE, then the rollback entry has already been applied to the data block. However, if the bit is set to FALSE, then the rollback entry has not been applied to the data block.

If the rollback entry has been applied to the data block, then the rollback entry is not re-applied; rather, a next rollback entry in the undo record is established and the process repeats. If the rollback entry has not been applied, then undo information from the rollback entry is retrieved from the undo record and a change is generated for the data block. A status flag is set to indicate that the rollback entry has been performed and a next rollback entry corresponding to the data block is retrieved. The process repeats until there are no more rollback entries to apply to that data block, then the generated changes are written to disk in a single atomic operation. If all the rollback entries have been applied, the undo record will be removed from the transaction undo chain. The next undo record will become the current rollback entry.

Undo Log Structures

Figure 1:
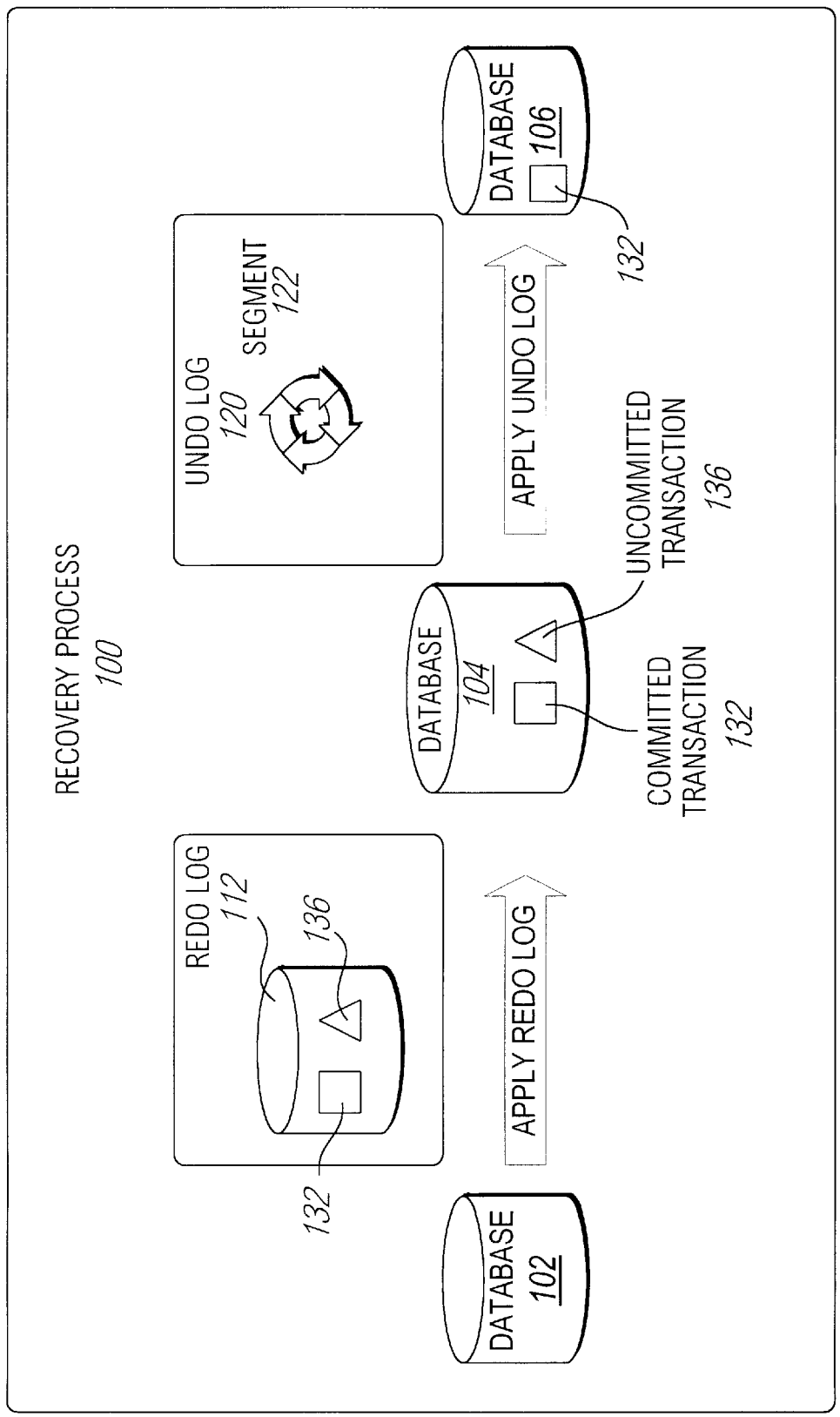
FIG. 1 is a block diagram of a recovery process.
Figure 2:
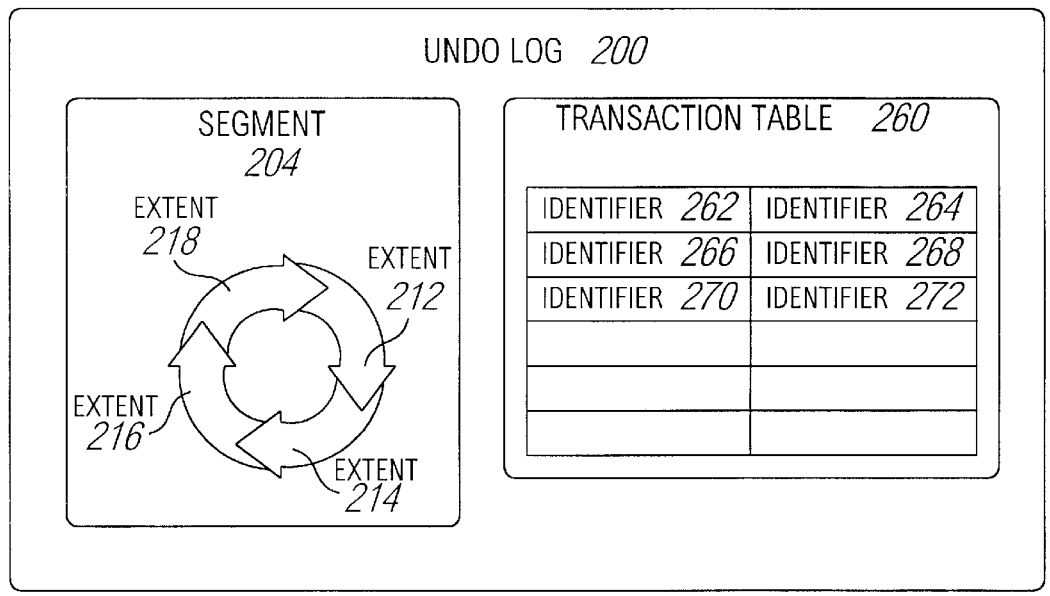
FIG. 2 is a block diagram of an undo log.

FIG. 2 illustrates the structure of an undo log 200 according to one embodiment of the present invention. Undo log 200 comprises a rollback segment 204. Segment 204 comprises a plurality of extents 212, 214, 216 and 218. An extent is a logical unit of database storage space. Extents 212, 214, 216 and 218 are used to store a plurality of contiguous undo blocks. Each undo block in an extent may store a plurality of undo records.

In order to keep track of changes made by each transaction, undo log 200 also contains a transaction table 260 to record information about the changes of each transaction stored in the segment 204. The transaction table 260 is useful in identifying the most recently saved undo record(s) for a transaction. For example, in transaction table 260, transaction identifier 262 identifies a particular transaction and pointer 264 points to an undo record in a string of undo records for the particular transaction identified by identifier 262. Likewise, transaction identifier 266 identifies a particular transaction and pointer 268 points to an undo record in a string of undo records associated with transaction identifier 266, as do transaction identifier 270 and pointer 272.

Although not depicted in FIG. 2, segment 204 may keep a header for additional information about changes stored therein, for example information about the transactions, data blocks and undo blocks in the segment 204.

According to one embodiment, additional data structures are also associated with the undo log 200. It is useful to describe these data structures before describing, in detail, the steps of incremental undo.

Figure 4A:
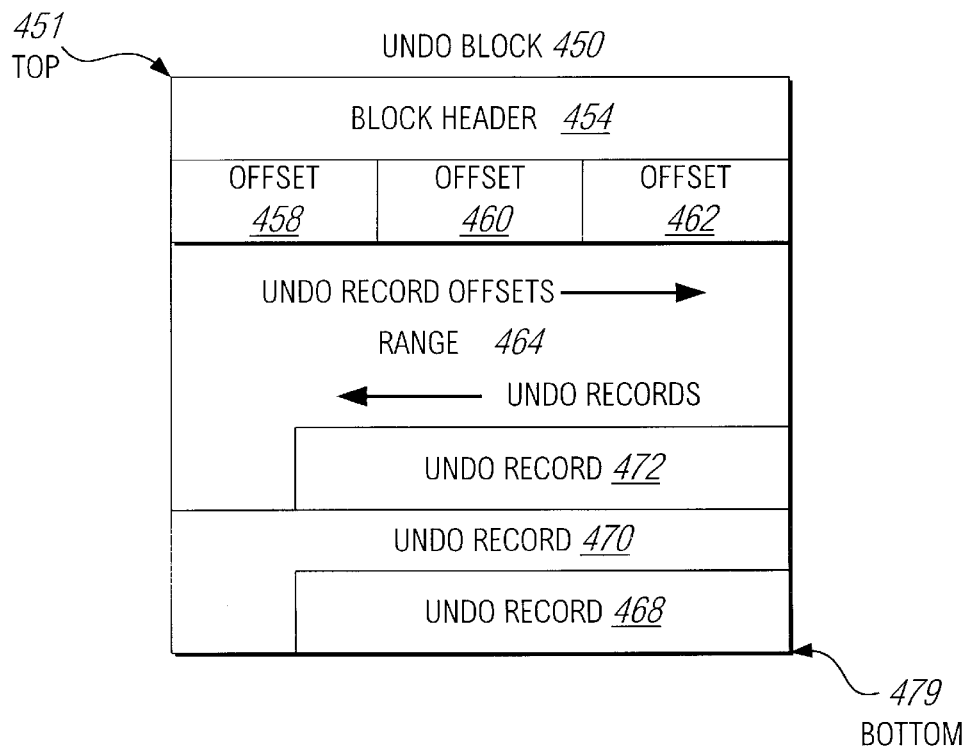
FIG. 4A is a block diagram of an undo block according to one embodiment of the present invention.

An additional data structure used by undo log 200 is undo block 450, which is depicted in FIG. 4A. According to one embodiment, undo block 450 is employed as a data structure in which general information about undo records is stored, as well as the undo records themselves. The undo block 450 is used to help the undo process identify and navigate to particular undo records 472 (depicted in further detail with reference to FIG. 4B). The undo block 450 is typically stored on persistent disk (e.g., storage device 310).

Figure 4B:
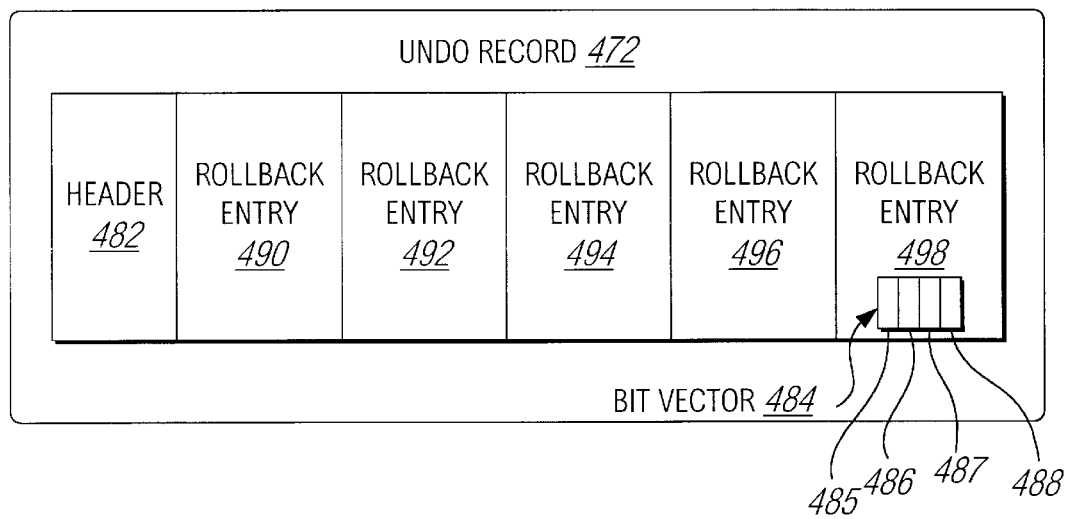
FIG. 4B is block diagram of an undo record according to one embodiment of the present invention.

Another data structure is undo record 472, depicted in FIG. 4B. An undo record 472 stores general information about the rollback entries therein, as well as the rollback entries themselves. The undo record stores the specific change information for data blocks updated, deleted or modified by changes in a transaction. The undo record 472 depicted in FIG. 4B is a linearized structure and it is typically stored on disk.

Figure 4C:
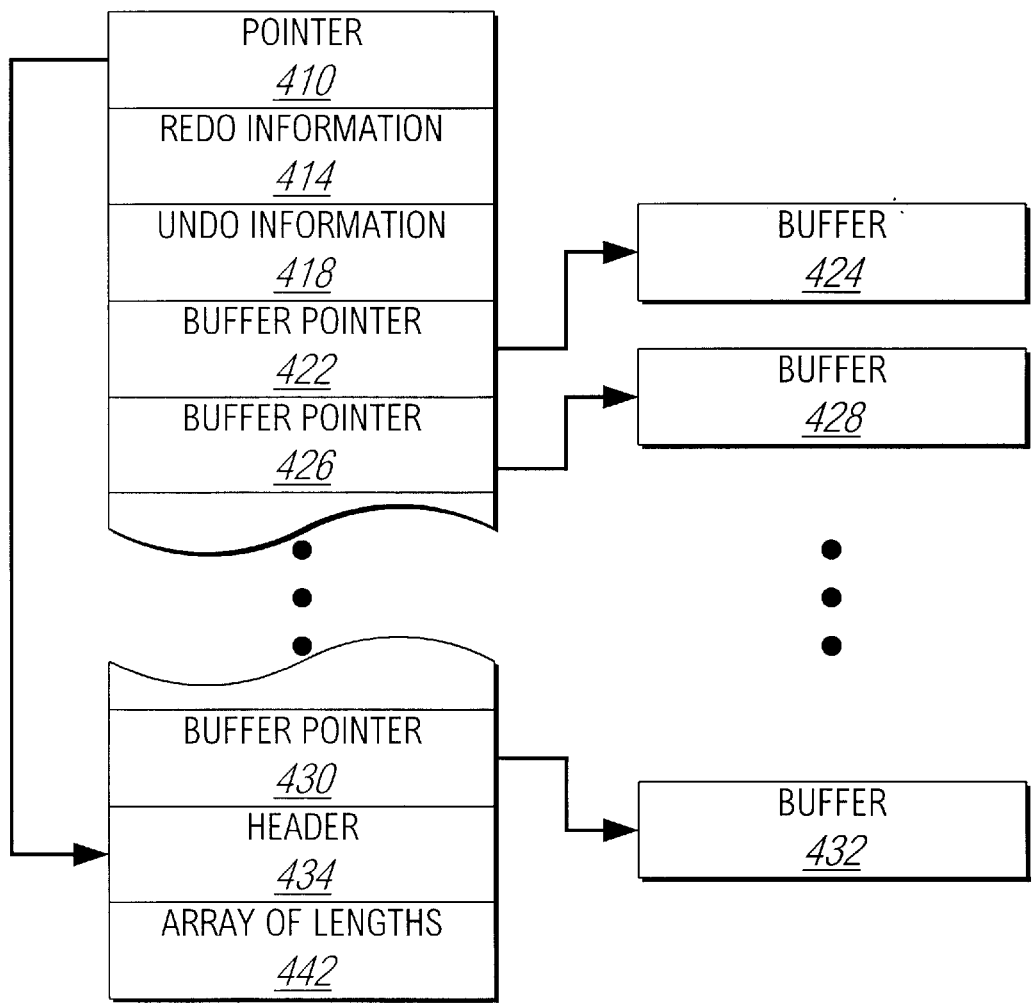
FIG. 4C is a block diagram depicting a change vector.

Yet another data structure, depicted in FIG. 4C, is a change vector 400. According to one embodiment, a change vector 400 is employed as a data structure in which undo information is stored in memory (e.g., main memory 306) before being saved to disk. The change vector 400 is used to help the undo process identify and navigate to a particular rollback entry.

Each of the additional structures referenced above shall be described in greater detail below.

Undo block 450, as depicted in FIG. 4A, holds data representing the changes made to one or more data blocks in the database system. According to one embodiment, undo block 450 comprises a block header 454, an array of offsets 458, 460 and 462, and undo records 468, 470 and 472. According to one embodiment, the block header 454 is used to identify and the undo records (e.g., 468, 470 and 472) in the undo block 450. Additionally, the block header 454 may be used to store linking information that identifies an order in which the undo records should be performed and/or the transactions the undo records 468, 470 and 472 correspond to. The offsets 458, 460 and 462 are used as tools to facilitate navigation to particular undo records (e.g., 468, 470 and 472) within the undo block 450, specifically, the offsets each give an offset to an address where a particular undo record is located.

Undo block 450 also has a range of storage 464. Range 464 is unused space in the undo block 450 that is designed to be allocated as changes are made and recorded into undo block 450. Undo records 468, 470 and 472 in undo block 450 are stored from the bottom (479) of undo block 450 to the top (451), whereas offsets 458, 460 and 462 are stored from the top (451) of undo block 450 to the bottom (479). The first offset 458 corresponds to rollback entry 468, the second offset 460 corresponds to the second to last rollback entry 470, the third offset 462 corresponds to rollback entry 472 and so on and so forth until range 464 is filled with rollback entries and offsets.

According to one embodiment, and as depicted in FIG. 4B, each undo record (e.g., 472) comprises a header 482 and a plurality of rollback entries (e.g., 490, 492, 494, 496 and 498). As was mentioned above, a rollback entry stores a change made by a transaction and there may be many changes associated with a single transaction. Header 482 comprises data about the undo record, as well as data about the rollback entries in the undo record (e.g., database address, tablespace and rollback entry offsets). Although FIG. 4B depicts only four rollback entries, there may be many more rollback entries in a particular undo record. Further, according to one aspect of the invention, the rollback entries in a particular undo record can correspond to different data blocks.

Also depicted in undo record 472 is a bit vector 484. Bit vector 484 has four bits 485, 486, 487 and 488. Each bit in the bit vector 484 indicates a status of a particular rollback entry. For example, the status bit that corresponds to a particular rollback entry may initially be set to FALSE to indicate that the rollback entry has not been applied. The bit may then be set to TRUE (or "applied") once the rollback entry is applied to its corresponding data block. Although bit vector 484 has only four bits, it may have as many bits as there are rollback entries in the undo record 472. As depicted in FIG. 4B, bits 485, 486, 487 and 488 are status bits for rollback entries 490, 492, 494 and 496 respectively. According to one embodiment, the last rollback entry 498 is modifiable during the undo application process. In this embodiment, information about which rollback entries have been applied, or a "status flag" may be stored in the modifiable last rollback entry 498 (e.g., bit vector 484).

The invention described herein does not need the change vector 400, depicted in FIG. 4C, to be practiced. However, according to one embodiment, a change vector 400 is utilized to temporarily store change information in memory before it is linearized and saved to disk. As used in one embodiment, change vector 400 is used to store control and processing information for undo segments. Additionally, change vector 400 may be used to store redo and undo records for the redo and undo processes themselves. For example, the change vector 400 is used by the undo process to identify and locate changes made either to a particular data block or by a particular transaction.

Change vector 400 includes a set of pointers to buffers and an array of lengths for each of the buffers. The change vector 400 also stores information about itself, such as the number of entries in the change vector 400, the size of the change vector 400, information about data blocks and transactions for which there is corresponding undo information in the change vector 400 and an array of lengths for the buffers in the change vector 400.

In the illustrated embodiment, change vector 400 comprises: a pointer 410, redo information 414, undo information 418, a plurality of buffer pointers 422, 426 and 430, a header 434 and an array of lengths 442.

Pointer 410 points to header 434. Header 434 contains information that describes change vector 400. For example, header 434 may be used to store the number of entries in the change vector 400, a disk block identifier and the size of the change vector 400.

Redo information 414 comprises data describing how to redo changes made by the undo process, whereas undo information 418 comprises data describing how to undo (or rollback) changes made by the undo process.

Buffer pointers 422, 426 and 430 point to buffers 424, 428 and 432 (there may be more than just the three buffer pointers and buffer pairs depicted in change vector 400). According to one embodiment, undo blocks 450 are temporarily stored in the buffers (e.g., 424 and 428). According to another embodiment, the last buffer 432 is a modifiable buffer. An advantage of employing modifiable buffer 432 is that information about the undo (e.g., state information) can be modified while changes are being applied to disk.

Array of lengths 442 stores lengths for each of the buffers 424, 428 and 432.

In one embodiment, the change vector 400 structure is created by a caller or a process that initiates a change to a data block. The caller stores information about the change (e.g., data block identifiers, block descriptors and undo records) in memory, but does not save the information to disk. Instead, one or more processes responsible for removing changes from data blocks, referred to herein as the "undo process", commit the information to disk and will, if necessary, remove the changes recorded therein. In this embodiment, the header 434, the array of lengths 442 and the buffers 424, 428 and 432 are committed to disk by the undo process before the change is made to disk.

Steps For Incremental Undo

Figure 5:
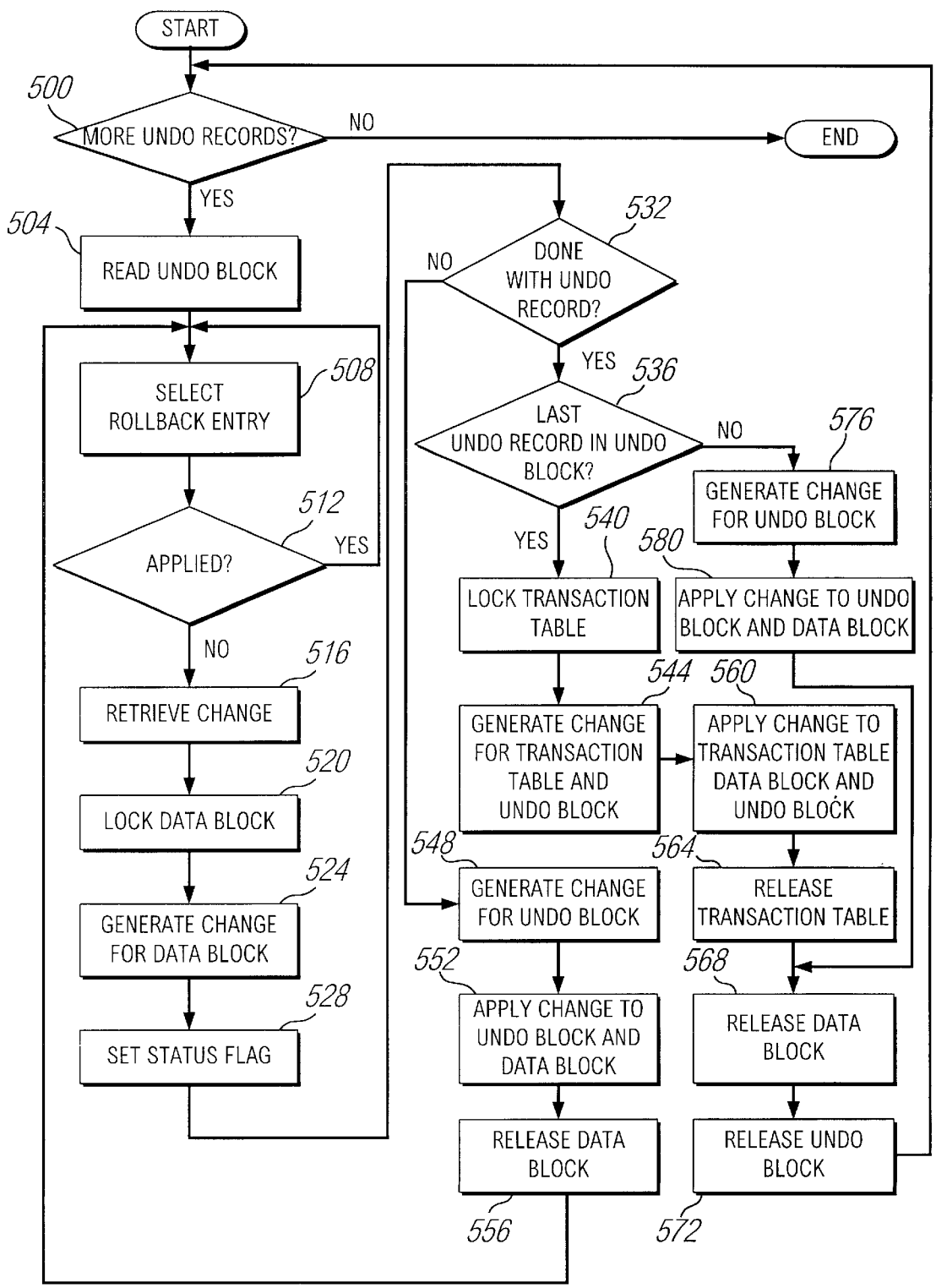
FIG. 5 is a flowchart depicting the steps for incrementally applying an undo record according to one embodiment of the present invention.

FIG. 5 is a flowchart depicting the steps for incremental undo according to one embodiment. With reference to FIG.

5 and the description that follows, it is assumed that the database server has initiated an undo process to rollback a series of changes which correspond to a transaction. Further, the description is a detailed description of a generic undo process, however, a specific example of the undo process is also provided.

According to one embodiment, isolation is provided by acquiring a transaction lock when beginning the undo process. According to another embodiment, the data blocks and/or undo blocks needed in the undo process are locked in exclusive mode. By locking the blocks, the database can be assured that the changes made by the undo process can be isolated so that other, concurrent processes or transactions will not see or create an inconsistency in the data and vice-versa. In either event, the undo block 450 is locked before the process begins.

Referring to FIG. 5, in step 500, a test is performed to determine whether there are any undo records in the transaction to rollback. If there are not any undo records, then the process terminates; however, if there are undo records to rollback, then the process continues to step 504. In step 504, the undo block 450 is read. Next, in step 508, a rollback entry is selected from undo record 472. According to one embodiment, "selecting" a rollback entry means that a particular rollback entry is identified. In later steps of the undo process described herein, information about the selected rollback entry will be analyzed to determine the appropriate steps to perform. For example, on the undo process' first pass through undo block 450, information about rollback entry 496 may be selected if rollback entry 496 holds information about the last change for a particular data block and transaction contained in the undo block 450.

In step 512, a test is performed to determine whether the status of the selected rollback entry (or a corresponding bit from bit vector 484) has been set as "applied". In one embodiment, the bit vector 484 is tested to determine whether the bit 488, corresponding the rollback entry 496, is set to TRUE (or "applied"). In response to testing, if the rollback entry has been applied, then the process returns to step 508 and a next rollback entry is selected from the undo record 472. However, in response to testing in step 512, if the status of the rollback entry has not been set as "applied", then the process continues to step 516.

In step 516, change information stored in the rollback entry is retrieved. According to one embodiment, an offset is read from the header 482 and, based on the rollback entry offset, the rollback entry (490, 492, 494 or 496) is retrieved from undo record 472. In step 520, an appropriate data block is locked, and in step 524 a change is generated for the data block. Next, in step 528, the status flag is set. According to one embodiment, a bit (e.g., 488) in bit vector 484 is set to TRUE. Although steps 508 through 528 have been described with reference to a single rollback entry, according to one embodiment, a plurality of rollback entries are selected in step 508, tested in step 512, and changes retrieved in step 516. The plurality of rollback entries are preferably related to the same data block. Thus, the change generated in step 524 would correspond to the plurality of rollback entries, and, in step 528, status flags would be set for each of the rollback entries for which a change was retrieved.

Next, the process continues to step 532. In step 532, a test is performed to determine if the caller that initiated the undo process is done with the undo record 472. Note that, according to one embodiment, the caller that initiated the undo process may choose to apply all or only one of the rollback entries stored in the undo record 472. Consequently, this will affect whether the caller has any more use for (or is "done" with) the undo record 472. For example, only rollback entries corresponding to a particular data block may be applied, even though the undo record 472 contains rollback entries for changes to numerous data blocks. If the client that initiated the undo process is done with the undo record 472, then the process continues to step 536, which is described in further detail below. If the client is not done with the undo record 472, then the process continues to step 548, which is also described below.

In step 536, a test is performed to determine whether the undo record 472 is the last undo record in the undo block 450. If the undo record 472 is the last undo record in the undo block 450, then the process continues to step 540, which is described below. However, if the undo record 472 is not the last undo record, then the process continues to step 576. In step 576, a change is generated for the undo block 450. Next, in step 580, changes are applied to the undo block 450 and the data block, and the processing continues to step 568, described below.

In step 548, a change is generated for the undo block 450. Next, in step 552, the change to the undo block 450 is applied, as is the change to the data block. In step 556, the lock on the data block is released and the process continues to step 508.

In step 540 the transaction table 260 is locked. Changes are generated for the transaction table 260 and the undo block 450 in step 544. Next, the process continues to step 560 where the changes are applied to the transaction table 260, the data block and the undo block 450.

In step 564, the lock on the transaction table 260 is released. In step 568, the lock on the data block is released, and in step 572, the lock on the undo block 450 is released. Finally, the process continues to step 500, described above.

EXAMPLE

Figure 6:
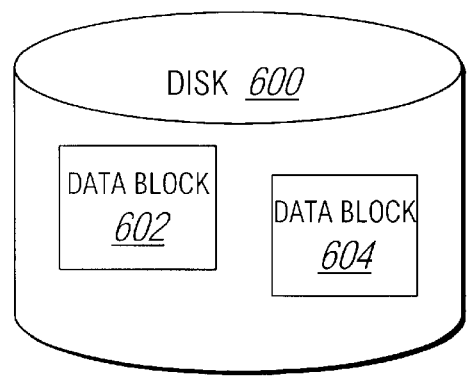
FIG. 6 is a block diagram depicting a persistent disk.

For example, referring to undo record 472 depicted in FIG. 4B, and disk 600 depicted in FIG. 6, assume that rollback entries 490 and 492 correspond to changes to data block 602, which is contained in disk 600, whereas rollback entries 494 and 496 correspond to changes to data block 604 (also contained in disk 600.) (Notice that a single undo record is associated with more than one data block.) Further, assume an undo process is initiated and the changes stored in undo record 472, the only undo record in a string of undo records (e.g., a transaction undo chain), needs to be applied to data block 602. The steps for incremental undo, according to one embodiment, are described in the example below.

Turning again to FIG. 5, the undo process begins by determining whether there are any undo records to apply in step 500. Since undo record 472 needs to be applied, in the next step, 504, the undo block 450 is read. Implicit in the request is a call to the cache layer or lock manager to lock the desired undo block before the undo block is read. According to one embodiment, block header 454 is read. Based on the data read, the undo records storing change information for the desired data block(s) are determined. Header 482 in undo record 472 is read, thereby identifying the last change, as well as the other changes, to data block 602 recorded in the undo record 472 (rollback entries 492 and 490).

In step 508, the undo record 672 is analyzed so as to select a rollback entry (or entries) to apply. For example, undo record header 482 and data about rollback entry 492 is read (e.g., bit 486 is read from bit vector 484 as well as an offset to rollback entry 492), as is the same of rollback entry 490 and bit 485. In step 512, the process determines whether the selected rollback entries 492 and 490 have been applied, in other words, have bits 486 and 485 been set to "applied?" Since bits 486 and 485 are not set to applied, the changes recorded in rollback entries 492 and 490 are retrieved from undo record 472 in step 516. Next, the data block 602 is locked in step 520, and in step 524, based on the change recorded in rollback entries 492 and 490, a change is generated for data block 602. According to one embodiment, this change is saved temporarily in a change vector 400, for example in one of the buffers 424 or 428. In step 528, bits 486 and 485 are set to "applied."

In step 532, a test is performed to determine whether any more rollback entries in the undo record 472 need to be applied. In response to testing, the undo process determines that more changes are needed from undo record 472, so the process continues to step 548 (in particular those changes for data block 604 need to be applied). In step 548, a change is generated for undo block 450. According to one embodiment, the change is generated for change vector 400 in modifiable buffer 432 (e.g., a memory copy of bit vector 484 is updated to reflect that bits 486 and 485 should be set as "applied"). Next, in step 552, the changes generated for undo block 450 and data block 602 in steps 548 and 524 respectively are applied to disk 600. In step 556, the lock on data block 602 is released and the process continues to step 508.

In step 508, rollback entries 496 and 494 are selected, and in step 512, the process determines whether the rollback entry 496 and 494 have been applied (e.g., are either bit 488 or 487 set to "applied?") Neither bit 488 or bit 487 is set to "applied," so the changes recorded in rollback entry 496 and 494 are retrieved from undo record 472 in step 516. In step 520, data block 604 is locked. Next, based on the changes recorded in rollback entries 496 and 494, a change is generated at step 524. In step 528, bits 488 and 487 are set to "applied."

In step 532, a test is performed to determine whether any more rollback entries in the undo record 472 need to be applied. In response to testing, the undo process determines that no more changes are needed from undo record 472, so the process continues to step 536. In step 536, a test is performed to determine whether there are any more undo records with changes in the undo block 450. In response to testing, the process determines the current undo record 472 is the last undo record in the undo block 450. Next, in step 540, the transaction table 260 is locked, and in step 544 a change is generated for the transaction table 260 and the undo block 450. In step 560, the changes to the transaction table 260, the data block 604 and the undo block 450 generated in steps 544, 524 and 548 are applied to disk 600. The lock on the transaction table 260 is released in step 564. The lock on the data block 604 is released in step 568, and the lock on the undo block 450 is released in step 572. Finally, the process continues to step 500, where a test is performed to determine whether there are any more undo records to apply. The test at step 500 is negative and the process terminates.

In the present example, more than one change was applied to data blocks 602 and 604 as a single atomic operation, but not all the changes in undo record 472 had to be applied at once. Rather, the changes may be performed in a divide and conquer fashion by first applying batches of changes to data block 602 and then applying batches of changes to data block 604. Additionally, the undo process is able to track the state (e.g., "applied" or "not applied") of individual rollback entries.

Because the techniques described herein allow rollback entries to be applied incrementally, or in non-contiguous batches of rollback entries, the undo process is afforded the option of applying a plurality of changes to a particular data block all at once and then moving to a next data block and applying all the changes. In the prior method, individual changes were applied as a single atomic operation rather than grouping the changes and applying multiple changes as a single atomic operation. In other words, there was one undo record per one data item changed in the prior method, whereas according to the present technique one undo record may be used to protect multiple data items changed. As a result, changes may be applied to data blocks in a divide and conquer manner.

Another advantage of the techniques described herein is that the overhead associated with rolling back changes to a particular data block is amortized over a plurality changes to the data block (e.g., each rollback entry), which results in a more efficient recovery process. Further, creating the undo log file will require less overhead too.

Still another advantage is that changes in the undo will exhibit the property of idempotency, which will support block or object level recovery. Idempotency means that if a change has been applied, then it will not be reapplied. For example, if a change is supposed to add the number "1" to a prior value of a data item, and the undo process did not have the property of undo idempotency, then "1" would be added to the prior value as many times as the change is re-applied to the prior value. However, using the status flag according to the present technique protects the prior value data item from having the change applied more than once.

Still another advantage of the present invention is that undo blocks are more compact and therefore take up less memory and less disk space. This is because information previously stored in the entry header 254 of the undo record 228 is now stored only once in the header 482 in the undo record 472, thereby eliminating redundancy. Additionally, an undo record can now comprise multiple rollback entries corresponding to more than one data block, and the likelihood of using previously unallocated/used space in the undo block is increased. This attribute also has the advantage of reducing the I/O associated with the undo operation.

The present invention is also useful when used in conjunction with "BATCH PROCESSING OF UPDATES TO INDEXES", which is described in U.S. patent application Ser. No. 08/855,544 filed on Jun. 4, 1997, which is incorporated herein by reference.

In the foregoing specification, the invention has been described with reference to specific embodiments thereof. It will, however, be evident that various modifications and changes may be made thereto without departing from the broader spirit and scope of the invention. For example, various methods of acquiring and releasing locks may be employed (e.g., hierarchical locking or hash locking), and the elements in the data structures (e.g., undo block 450 and change vector 400) may be reordered, enhanced or combined into a single data structure. The specification and drawings are, accordingly, to be regarded in an illustrative rather than a restrictive sense.

What is claimed is:

1. A method for performing incremental undo when recovering a computer database from a failure, the method comprising:

storing changes for a plurality of data blocks in a single undo record;

establishing as a current rollback entry, a rollback entry that belongs to a plurality of rollback entries within said single undo record, said plurality of rollback entries corresponding to a particular data block in said plurality of data blocks;

examining a status flag corresponding to said current rollback entry to determine whether said current rollback entry has been applied;

establishing a next rollback entry in said plurality of rollback entries as said current rollback entry without applying said current rollback entry when said current rollback entry has been applied; and when said current rollback entry has not been applied, then:
  retrieving said current rollback entry from said plurality of rollback entries;
  applying one or more changes indicated by said current rollback entry to said particular data block; and
  setting said status flag in said undo record to indicate said current rollback entry has been applied.

2. The method of claim 1, wherein said step of applying said one or more changes indicated by said current rollback entry comprises applying all rollback entries for at least one transaction that are stored in said plurality of rollback entries in a single atomic operation.

3. The method of claim 1, further comprising the step of retaining said rollback entry in said undo record after said step of applying said current rollback entry to said particular data block.

4. The method of claim 1, further comprising the step of maintaining a change vector in a buffer cache, wherein said change vector comprises a plurality of buffers for storing said change information, said change vector including a modifiable change buffer for storing information corresponding to said status flag.

5. The method of claim 4, further comprising:
  examining said change vector to identify changes to apply to said particular data block; and
  retrieving address information identifying a particular rollback entry from said change vector.

6. The method of claim 4, further comprising the step of storing recovery information about the incremental undo process itself in said change vector.

7. A computer-readable medium carrying one or more sequences of instructions for performing incremental undo when recovering a computer database from a failure, wherein execution of the one or more sequences of instructions by one or more processors causes the one or more processors to perform the steps of:

storing changes for a plurality of data blocks in a single undo record;

establishing as a current rollback entry, a rollback entry that belongs to a plurality of rollback entries within said single undo record, said plurality of rollback entries corresponding to a particular data block in said plurality of data blocks;

examining a status flag corresponding to said current rollback entry to determine whether said current rollback entry has been applied;

establishing a next rollback entry in said plurality of rollback entries as said current rollback entry without applying said current rollback entry when said current rollback entry has been applied; and when said current rollback entry has not been applied, then:
  retrieving said current rollback entry from said plurality of rollback entries;
  applying one or more changes indicated by said current rollback entry to said particular data block; and
  setting said status flag in said undo record to indicate said current rollback entry has been applied.

8. The computer-readable medium of claim 7, wherein said step of applying said one or more changes indicated by said current rollback entry comprises applying all rollback entries for at least one transaction that are stored in said plurality of rollback entries in a single atomic operation.

9. The computer-readable medium of claim 7, wherein execution of the one or more said sequences of instructions by one or more processors causes the one or more processors to further perform the step of retaining said rollback entry in said undo record after said step of applying said current rollback entry to said particular data block.

10. The computer-readable medium of claim 7, wherein executing the one or more sequences of instructions by one or more processors causes the one or more processors to further comprising the step of maintaining a change vector in a buffer cache, wherein said change vector comprises a plurality of buffers for storing said change information, said change vector including a modifiable change buffer for storing information corresponding to said status flag.

11. The computer-readable medium of claim 10, wherein executing the one or more sequences of instructions by one or more processors causes the one or more processors to further perform the steps of:
  examining said change vector to identify changes to apply to said particular data block; and
  retrieving address information identifying a particular rollback entry from said change vector.

12. The computer-readable medium of claim 10, wherein executing the one or more sequences of instructions by one or more processors causes the one or more processors to further perform the step of storing recovery information about the incremental undo process itself in said change vector.

13. A computer system comprising a database server, wherein said database server is configured to recover a particular data block from a failure by performing the steps of:

storing changes for a plurality of data blocks in a single undo record, said plurality of data blocks including said particular data block;

establishing as a current rollback entry, a rollback entry that belongs to a plurality of rollback entries within said single undo record, said plurality of rollback entries corresponding to said particular data block;

examining a status flag corresponding to said current rollback entry to determine whether said current rollback entry has been applied;

establishing a next rollback entry in said plurality of rollback entries as said current rollback entry without applying said current rollback entry when said current rollback entry has been applied; and when said current rollback entry has not been applied, then:
  retrieving said current rollback entry from said plurality of rollback entries;
  applying one or more changes indicated by said current rollback entry to said particular data block; and
  setting said status flag in said undo record to indicate said current rollback entry has been applied.

14. The computer system of claim 13, wherein said step of applying said one or more changes indicated by said current rollback entry comprises applying all rollback entries for at least one transaction that are stored in said plurality of rollback entries in a single atomic operation.

15. The computer system of claim 13, said computer system further configured to perform the step of retaining said rollback entry in said undo record after said step of applying said current rollback entry to said particular data block.

16. The computer system of claim 13, said computer system further configured to perform the step of maintaining a change vector in a buffer cache, wherein said change vector comprises a plurality of buffers for storing said change information, said change vector including a modifiable change buffer for storing information corresponding to said status flag.

17. The computer system of claim 16, said computer system further configured to perform the steps of:

examining said change vector to identify changes to apply to said particular data block; and retrieving address information identifying a particular rollback entry from said change vector.

18. The computer of claim 16, said computer system further configured to perform the step of storing recovery information about the incremental undo process itself in said change vector.

* * * * *